Jan. 1, 1946.　　　DE LANEY E. SEXTON　　　2,392,068

ELECTRIC BRAKE

Filed Jan. 3, 1944

DELANEY E. SEXTON
INVENTOR.

BY
ATTORNEY

Patented Jan. 1, 1946

2,392,068

UNITED STATES PATENT OFFICE 2,392,068

ELECTRIC BRAKE

De Laney E. Sexton, Bremerton, Wash.

Application January 3, 1944, Serial No. 516,748

7 Claims. (Cl. 188—158)

This invention relates to electrically actuated braking mechanisms and it has particular reference to such a brake especially adapted for use on turning lathes.

In production work, especially on a lathe, it is necessary that the chuck wrench be inserted in the same tightening screw of the three jawed chuck. This is necessary to obtain centering of the piece to be worked upon. Customarily, the jaws are bored out to obtain a true centering but unless the wrench be inserted in the same tightening screw each time, it is possible and highly probable that the work will be out of center by several thousandths of an inch.

Therefore, it is desirable, to speed production and output, that the identical tightening screw face the operator of the lathe or other machine each time the machine is stopped without requiring that the operator go to the trouble of hand turning the chuck to the desired position.

The principal object of the present invention is to provide an electric brake so constructed and arranged that upon actuating a switch to open the machine power circuit, the circuit of the braking mechanism is simultaneously closed, which action energizes one of two solenoids to impose thereby a continuous contracting force on the brake band and, by virtue of certain other provisions, the companion solenoid is intermittently energized to impose upon the brake band an intermittent contracting force, tending to retard the rotating speed of the machine, the combined action of the solenoids on the brake band being such that the revolving body will stop in a predetermined position.

Another object of the invention is to provide a signal circuit in connection with the brake circuit whose function is to visibly disclose to the operator periods during which the brake circuit is energized.

Figure 1:
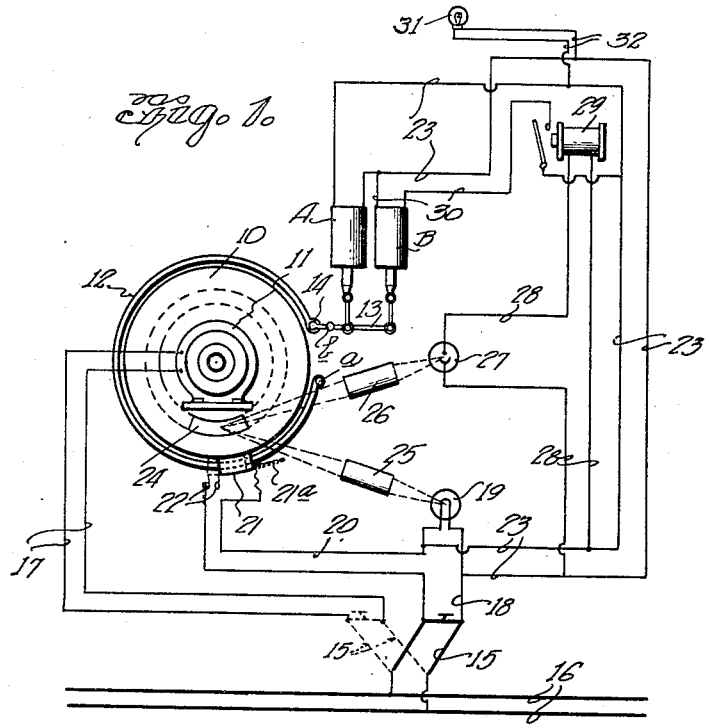
Figure 2:
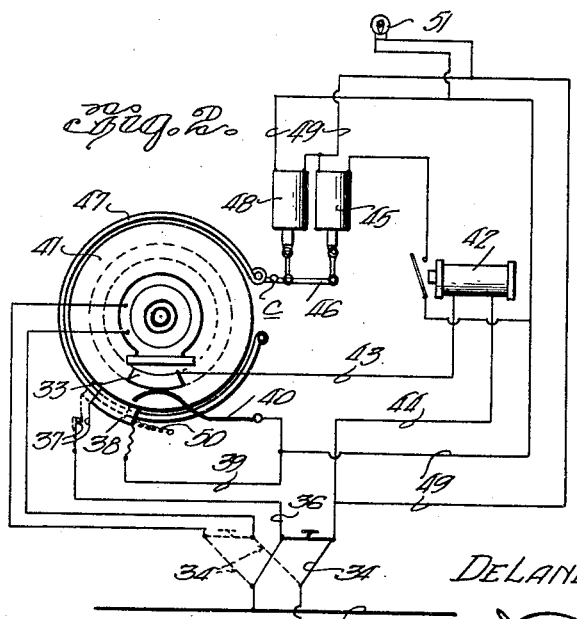

With the foregoing objects as paramount, the invention has further reference to certain features of accomplishment which will become apparent as the description proceeds, taken in connection with the accompanying drawing wherein:

Figure 1 is a schematic view of a brake controlled, revolving body, such as a lathe pulley, and diagrammatically illustrating the electrical elements of the invention, as associated therewith, and Figure 2 is a similar view but showing a modified example of the invention.

Continuing with a more detailed description of the drawing, reference is primarily made to Figure 1 wherein is shown an element 10 which will be referred to herein and in the claims from time to time as a rotating body and is intended to simulate a lathe pulley or like machine part.

As shown, the element 10 is adapted to be driven by an electric motor 11 and is controlled by a brake band 12, contractible upon the periphery of the element 10 which possesses or becomes a brake drum.

One end of the brake band or shoe 12 is anchored at $a$ while its opposite end is intended to be actuated by a linkage consisting of an arm 13, one end of which is pivotally connected at 14 to the free end of the brake band and, by virtue of an intermediate pivot $b$, upward movement of the outer end of arm 13 will tend to contract the band 12 on the drum 10.

The medium by which the foregoing movement is imparted to the arm 13 consists of two solenoids A and B of substantially equal ohmic resistance and whose armatures are each pivotally joined to the arm 13. In a manner to become apparent presently, solenoid B is energized intermittently to effect intermittent application of the brake as a slowing down process while the companion solenoid A receives a constant charge to apply a continuous force calculated to supplement the force imposed by solenoid B, the result being that the body 10 will cease rotating at a given point.

When the D. P. D. T. switch 15 is in the position shown in dotted lines in Figure 1, current flows from the source 16 through wires 17 to the motor 11 to rotate the element 10. When it is desired to stop the element 10 from rotating and to insure stoppage at a predetermined point in the cycle, the switch 15 is moved to the alternate position shown in solid lines to energize the braking circuit.

When the braking circuit is energized, current flows from source 16 through wire 18 to an incandescent lamp 19, illuminating the same, thence through wire 20 to one terminal of a friction switch 21, the latter being actuated through the action of friction caused by switch 21, riding the surface at the revolving body 10 to close contacts 22. Further reference to this switch will be made presently.

Closing of contacts 22 by action of the friction switch 21 will establish a current in wires 23 to energize solenoid A whose armature will retract, exerting a continuous pull on the arm 13 to contract the band 12, so long as contacts 22 are in engagement.

It will be observed that the rotating body 10 is provided on one face thereof with a segment 24 constructed of light reflecting material or may, in some cases consist simply of paint. In any case, it is preferred that this reflecting surface be made adjustable so that it may be moved in a circular manner about the axis of the body 10 as suggested by the parallel broken lines thereon. This provision is made so that the predetermined points of stoppage may be altered as will become apparent.

Focused on the reflecting surface 24 is a condenser lens 25 through which a ray of light emanating from the lamp 19 is projected onto the reflecting surface and which latter, in turn, reflects the light through a companion condenser lens 26 onto a photo-electric cell 27, thereby energizing the same. When this occurs, which it does at each revolution of the body 10, current flows in wires 28 to the relay 29 whose actuation thereby energizes the solenoid B through wires 30 whose action will, of course, be intermittent to similarly actuate the brake band 12 by reason of its connection therewith through arm 13. The result will be a slowing down by periodic or intermittent impulses until the revolving speed of the body 10 will be reduced to such degree that it will cease rotating entirely upon reaching a given position determined entirely by the position or location of the reflecting surface 24 on the face of the body 10.

As soon as the body 10 ceases to rotate the friction switch 21, under the influence of spring 21a will return to inoperative position and when this occurs, the points 22 will separate, opening the brake circuit. As long as the brake circuit remains energized a pilot or signal lamp 31 will glow by reason of its connection through wires 32, 23, 18 and 20 to the source but will be extinguished immediately upon opening the contacts 22 as explained. Thus the operator is at all times apprised as to whether or not the brake circuit is energized. However, it is not possible for the operator to energize the power circuit 17 since this circuit and the brake circuit can only be alternately energized due to the provision of the D. P. D. T. switch 15 whose position determines the operativeness of the circuits.

In Figure 2 is a modified system for electrically predetermining the stopping position of a lathe spindle or other rotating body. In this form of the invention, the photo-electric cell and exciting lamp are dispensed with and in their stead there is provided a ferrous segment 33, quite similar in appearance to the reflecting segment of the earlier described embodiment and serves in substantially the same capacity.

When the switch 34 is in the solid line position in Figure 2, the brake circuit is energized, current flowing from source 35 through wires 36 to one of two complementary contacts 37, through friction switch 38, through wire 39 to a spring contact 40 which latter is intermittently engaged by the segment 33 as the body 41 revolves. Current is therefore intermittently established through relay 42 through wires 43 and 44 to energize solenoid 45. The armature of this solenoid is retracted, which action exerts a pull upon arm 46, which latter, due to its connection with brake band 47 and intermediate pivot c, contracts the band with a series of successive impulses which tend to retard the speed of the body 41 and, combined with the continuous force applied by the companion solenoid 48, whose operation will be presently explained, the body 41 will eventually cease rotating at a point predetermined by the position of the segment 33.

Energization of the solenoid 48 is effected by current flowing in wires 49, which are joined to wires 39 and 44, the latter, in turn, extending to source 35.

The friction switch 38, as in the preceding case, becomes inoperative upon cessation of rotation of body 41 by the influence of spring 50 and separates the contacts 37. This action breaks the circuits to the solenoids 45 and 48, allowing the band 47 to expand. As in the earlier described arrangement, a signal or pilot lamp 51 visibly indicates the condition of the circuits, that is, it remains illuminated as long as the brake circuit is energized.

It is apparent from the foregoing that the described brake may be adapted to any type of machine whose operation and performance will be improved or facilitated by stopping it in a predetermined position and it is understood that the invention is not limited as to use and that certain changes and modifications may be resorted to from time to time as may fall within the intent and meaning of the appended claims.

What is claimed is:

1. An electric brake including in combination with a rotatable body, a contractible friction band on said body, a brake circuit, a pair of independently actuatable solenoids in said brake circuit, one being effective to intermittently contract said friction band to retard the speed of said rotatable body, the other applying a continuous force to said friction band, means annularly adjustably mounted about the axis of said rotatable body for energizing said intermittently actuatable solenoid, and means for energizing the companion solenoid.

2. An electric brake including in combination with a revolving body, a friction brake in control of said body, a brake circuit, a solenoid in said circuit for imposing periodic pressure on said friction brake to retard the speed of said revolving body, a companion solenoid in said brake circuit for imposing continuous pressure on said friction brake during deceleration of the revolving body, a switch frictionally actuated by movement of said revolving body to energize and deenergize said solenoids, and adjustable means annularly mounted about the axis of said revolving body for controlling the flow of current to said first solenoid.

3. In an electric brake for lathes, a brake drum on the spindle shaft of said lathe, a contractible friction brake in control of said drum, a brake circuit, magnetic means in said brake circuit adapted to impose a continuous contracting force on said brake when said circuit is energized, companion magnetic means for imposing an intermittent contracting force on said brake to supplement the effects of said first magnetic means, and means annularly adjustably mounted about the axis of said brake drum to effect energization of said companion magnetic means.

4. In an electric brake for lathes, a brake drum in control of the spindle shaft of said lathe, a brake on said drum, a brake circuit, magnetic means in said circuit for imposing a continuous contracting force on said brake, companion magnetic means for supplementing the force of said first magnetic means by imposing an intermittent force on said brake to effect stoppage of said spindle at a predetermined point and means adjustably mounted about the axis of said drum for rendering said companion means operative.

5. In an electric brake, a revolving body, friction means in control of said body, a brake circuit, independently actuatable magnetic means in said circuit, one being adapted to apply an uninterrupted force to actuate said brake, the other supplementing the force by the application of controlled, periodic impulses, and means annularly adjustably mounted about the axis of said revolving body to predetermine the timing of said impulses.

6. The organization as set forth in claim 5 in which the means for actuating the periodically operated magnetic means includes a reflecting surface carried by the revolving body and movable on said body about its center, a light source, a photo-electric cell periodically receiving a light beam reflected by said surface in rotation and a relay in circuit with said magnetic means and actuated by the photo-electric cell.

7. In an electric brake, a revolving body, a brake in control of said body, a brake circuit, a pair of solenoids in said circuit having operative connection with said brake, means for uninterruptedly energizing one of said solenoids to effect continuous application of said brake, a relay, and means carried by said revolving body, upon each revolution of said body, to interrupt current flow through said relay to the other of said solenoids to effect intermittent application of said brake supplemental to the applied pressure of said first solenoid to effect cessation of rotation of said body at a predetermined point.

DE LANEY E. SEXTON.